(12) United States Patent
Jensen

(10) Patent No.: US 9,662,935 B2
(45) Date of Patent: May 30, 2017

(54) WHEEL CONSTRUCTION

(75) Inventor: Joergen M. Jensen, Egtved (DK)

(73) Assignee: GKN Land Systems Limited, Telford (GB)

( * ) Notice: Subject to any disclaimer, the term of this patent is extended or adjusted under 35 U.S.C. 154(b) by 1177 days.

(21) Appl. No.: 12/089,195

(22) PCT Filed: Oct. 11, 2006

(86) PCT No.: PCT/GB2006/003786
§ 371 (c)(1),
(2), (4) Date: Dec. 2, 2008

(87) PCT Pub. No.: WO2007/042813
PCT Pub. Date: Apr. 19, 2007

(65) Prior Publication Data
US 2009/0223614 A1 Sep. 10, 2009

(30) Foreign Application Priority Data

Oct. 12, 2005 (GB) .................................. 0520724.6

(51) Int. Cl.
*B60B 21/10* (2006.01)
*B60B 21/02* (2006.01)
(52) U.S. Cl.
CPC ............ *B60B 21/102* (2013.01); *B60B 21/02* (2013.01); *B60B 21/104* (2013.01)
(58) Field of Classification Search
CPC ....... B60B 21/10; B60B 21/102; B60B 21/02; B60B 21/026; B60C 15/0226; B60C 15/02; B60C 15/0209
(Continued)

(56) References Cited

U.S. PATENT DOCUMENTS 4,502,521 A * 3/1985 Tavazza et al. ............ 152/381.4
4,561,482 A * 12/1985 Tavazza et al. ............ 152/381.4
(Continued)

FOREIGN PATENT DOCUMENTS

EP 0 358 490 A2 3/1990
EP 0 410 672 A1 1/1991
(Continued)

OTHER PUBLICATIONS

International Search Report for PCT/GB2006/003786, mailed Jan. 8, 2007.
(Continued)

*Primary Examiner* — Jason Bellinger
(74) *Attorney, Agent, or Firm* — Marshall, Gerstein & Borun LLP

(57) ABSTRACT

A wheel construction includes a circular wheel rim which receives a tire, the rim having axially inner and outer portions each having a flange providing a seat for a bead. The wheel construction including a mid-portion, and side parts connecting the mid and outer portions the mid-portion including a circumferential well where the radius of the wheel rim is a minimum, at least one of the side parts including plurality of curved regions the plurality of curved regions each being immediately adjacent to each other whereby the side part continuously undulates. Each curved region provides at least a further two circumferential well. For each adjacent two curved regions, there is an effective angle of between 25° and 45° between a plane normal to the axis of the wheel and a line struck tangentially at a point of inflection between the two curved regions.

16 Claims, 3 Drawing Sheets

(58) Field of Classification Search
 USPC ............ 301/95.101–95.102, 95.104–95.107;
 152/379.3–379.5, 381.3–381.4
 See application file for complete search history.

(56) References Cited

U.S. PATENT DOCUMENTS

| | | | |
|---|---|---|---|
| 4,878,527 A * | 11/1989 | Noma | 152/379.3 |
| 5,318,088 A | 6/1994 | Billieres | |
| 5,560,686 A | 10/1996 | Sayer et al. | |
| 6,474,385 B1 * | 11/2002 | Bonning et al. | 152/381.4 |
| 6,892,777 B2 * | 5/2005 | Muhlhoff | 152/381.4 |

FOREIGN PATENT DOCUMENTS

| | | |
|---|---|---|
| EP | 0 445 963 A1 | 9/1991 |
| EP | 0 540 492 A1 | 5/1993 |
| EP | 1 186 442 A2 | 3/2002 |
| EP | 1 543 997 A1 | 6/2005 |
| GB | 1 563 095 A | 3/1980 |
| JP | H0798441 B2 | 10/1995 |

OTHER PUBLICATIONS

Office Action for Japanese Patent Application No. 2008-535096, mailed Nov. 21, 2011.

\* cited by examiner

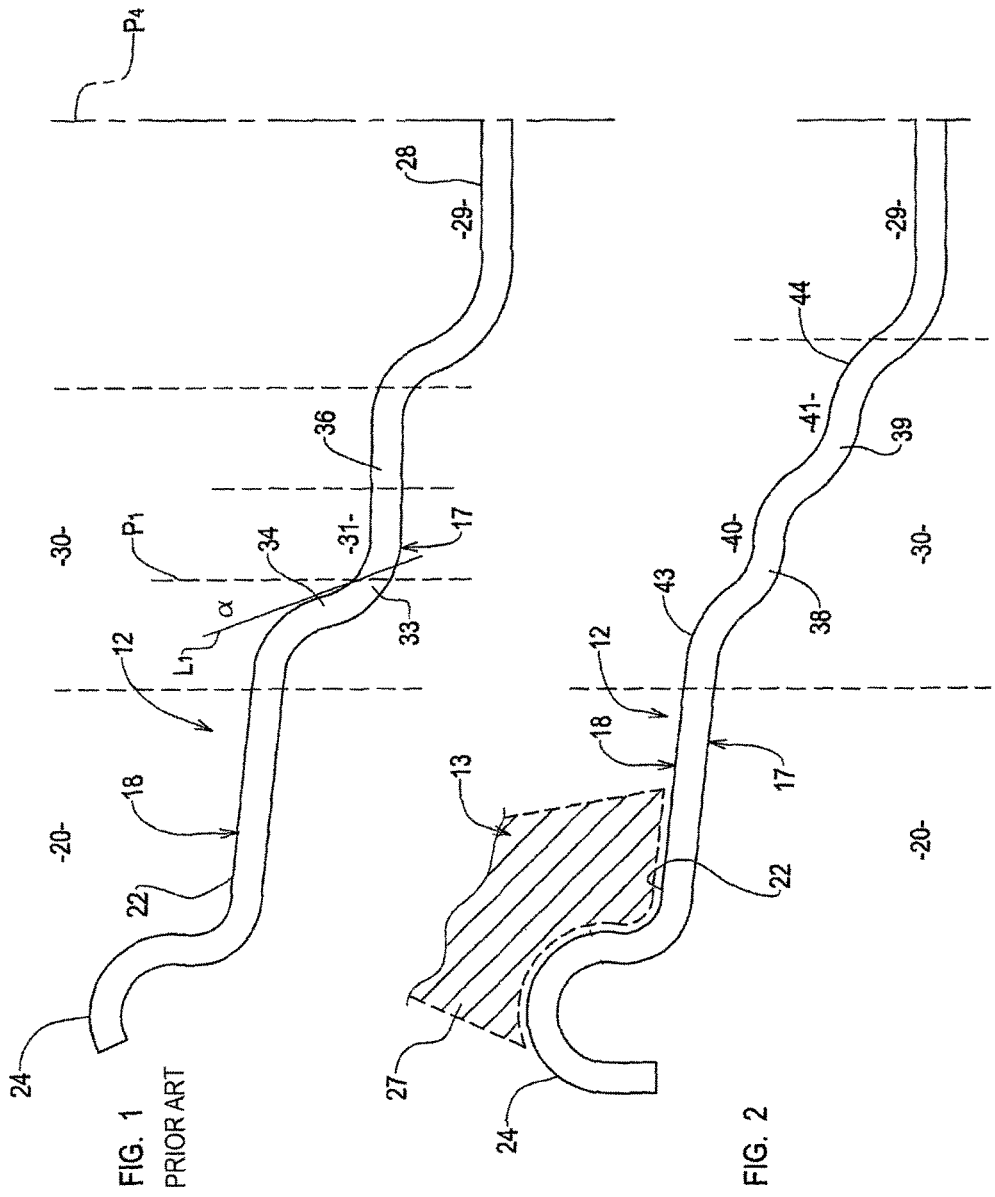

WHEEL CONSTRUCTION

FIELD OF THE INVENTION

This invention relates to a wheel construction and more particularly but not exclusively to a wheel construction for a tractor or the like.

BACKGROUND OF THE INVENTION

Wheel constructions are known, for example from U.S. Pat. No. 5,560,686 which include a circular wheel rim which provides respective axially inner and outer flanges which each provide a seat for a tyre bead of a tyre which is fitted to a radially outer, or "tyre side" of the rim. In the example of U.S. Pat. No. 5,560,686, the wheel construction further includes a disc by means of which the wheel is securable to a hub of the tractor, the disc being connected to a radially inner side of the rim and the disc and rim being separable.

The rim has a mid-portion which may typically be central, where, at the tyre side, a central well is provided, and includes side parts which extend radially outwardly between the central well and the flanges, the side parts each including a pair of straight surfaces (where the rim is viewed in cross section) and a connecting part between the straight surfaces, the connecting part including a well side wall which includes a straight portion, and a curved region which is generally concave when considered from the tyre side of the rim, the well side wall and curved region providing together in the connecting part, a further well. The central well of the central region and the further well in each side part, are provided to afford the rim with the necessary strength to withstand the forces imposed on the wheel construction in use.

Wheel constructions which only have a single, usually central well, are designated as "W" (well) designs, whereas wheel constructions which provide a further well in each rim side part are designated "DW" (double well) designs.

Internationally accepted standards set down certain wheel design criteria. For example, the current European Tyre and Rim Technical Organisation (ETRTO) standard for Agricultural Equipments requires that, for a "DW" designated design, at any circumferential position around the rim, in cross section, the minimum angle between a plane normal to the wheel axis and a line along a straight portion of the well side wall is 15°. Also the ETRTO standard requires that at the tyre side of the rim, an external radius where the straight portion of the well side adjoins and melds with the adjacent axially outer straight surface, is a minimum of 9.5 mm for a typical tractor wheel, and the maximum internal radius of the concave curved region is 14.5 mm.

As tractor and the like designs have progressed, tyres are being produced which are capable of supporting greater loads, and to achieve this, tyre walls are being made stiffer. This presents problems in fitting such tyres, particularly, where there is a well side wall at an angle close to the standard minimum relative to a plane normal to the wheel axis, as one or both of the tyre beads may not immediately seat on the flanges during initial inflation. Rather, one or both of the beads may temporarily seat on the well side wall during initial inflation, until a high pressure is established in the tyre, which may suddenly be released as the bead or beads disengage the well side wall and move towards the flanges.

In certain circumstances, to overcome this situation, tyre pressures may be increased to above that recommended by the tyre manufacturer.

With current single "W" and double "DW" well rim designs, there is little scope for increasing the angle of the well side walls whilst retaining the required strength in the rim, due to the restricted axial length of the rim, which is referred to commonly as the "width" of the wheel.

SUMMARY OF THE INVENTION

According to the invention we provide a wheel construction including a wheel rim which in use, receives a tyre, the rim being circular and having axially inner and outer portions each of which provides a flange which in use provides a seat for a bead of the tyre, and the wheel construction including a mid-portion between the inner and outer portions, and side parts, connecting the mid and inner and outer portions, the mid-portion including a circumferential well where the radius of the wheel rim is a minimum, at least one of the side parts including a plurality of curved regions, the plurality of curved regions each being immediately adjacent to each other whereby the side part is continuously undulate, and characterised in that each curved region provides at least a further two circumferential wells, and in that for each adjacent two curved regions, there is an effective angle between a plane normal to the axis of the wheel and a line struck tangentially at a point of inflection between the two curved regions at a tyre side of the rim, of between 25° and 45°.

Thus utilising the present invention, a wheel construction may be provided in which the problems of fitting tyres with stiff side walls identified above may at least be alleviated, due to the continuously undulate side part of the rim, and the multiple wells provided by the side part or parts.

Because the side part is continuously undulate, there is over the side part, no straight well side wall (when the rim is viewed in cross section) as with prior proposals It will be appreciated that this effective angle reduces significantly the steepness of the side part which otherwise could provide a temporarily seal for the tyre bead during initial inflation. In one typical example of the invention, this effective angle is in the order of 33°.

The present invention requires that the wheel construction has at least three wells according to the accepted nomenclature. Whereas the side part may have any plurality of curved regions each providing a well; desirably the wheel construction has between three and six wells.

In a preferred embodiment, the internal radii of each curved region at the tyre side of the rim, where a well is provided, are both preferably between 10 mm and 20 mm, and typically may be in the order of 15 mm.

The external radii at least where a curved region adjoins an adjacent curved region may be between 10 mm and 20 mm, and may typically be in the order of 15 mm.

Where the axially outermost curved region adjoins the respective inner or outer portion of the rim, the external radius at the tyre side of the rim may be between 10 mm and 20 mm, and may typically be in the order of 15 mm.

Desirably the axially innermost curved region directly adjoins the mid-portion without any straight surface there between, and the external radius where the innermost curved region and the mid-portion adjoin, may be between 10 mm and 20 mm, and may typically be in the order of 15 mm.

The respective inner or outer portion of the rim may include a connecting surface which connects the side part to the flange, and the connecting surface of the rim may be generally frusto-conical.

Whereas only one of the side parts of the wheel construction may include a continuously undulate side part, preferably both side parts of the wheel construction are continuously undulate. The wheel rim may be generally symmetrical about a central wheel plane normal to the wheel axis, and the well provided by the mid-portion may be a generally central well.

Although the invention may be applied generally to wheel constructions, the invention may particularly be applied where the wheel construction is for a tractor or similar vehicle wheel, in which the wheel construction includes a central disc connected to a radially inner side of the rim by permanent or separable connections, such as respectively, welding and a bolted connection, the disc having a plurality of openings to enable the disc to be attached to a hub or axle of the tractor, industrial machine or the like.

Embodiments of the invention will now be described with reference to the accompanying drawings in which:

BRIEF DESCRIPTION OF THE DRAWINGS

FIG. 1 is an illustrative cross sectional view through part of a rim of a prior art wheel construction for a tractor, industrial machine or the like;

FIG. 2 is a view similar to FIG. 1 but showing a part of a rim in accordance with the invention;

DETAILED DESCRIPTION OF THE INVENTION

Figure 3:
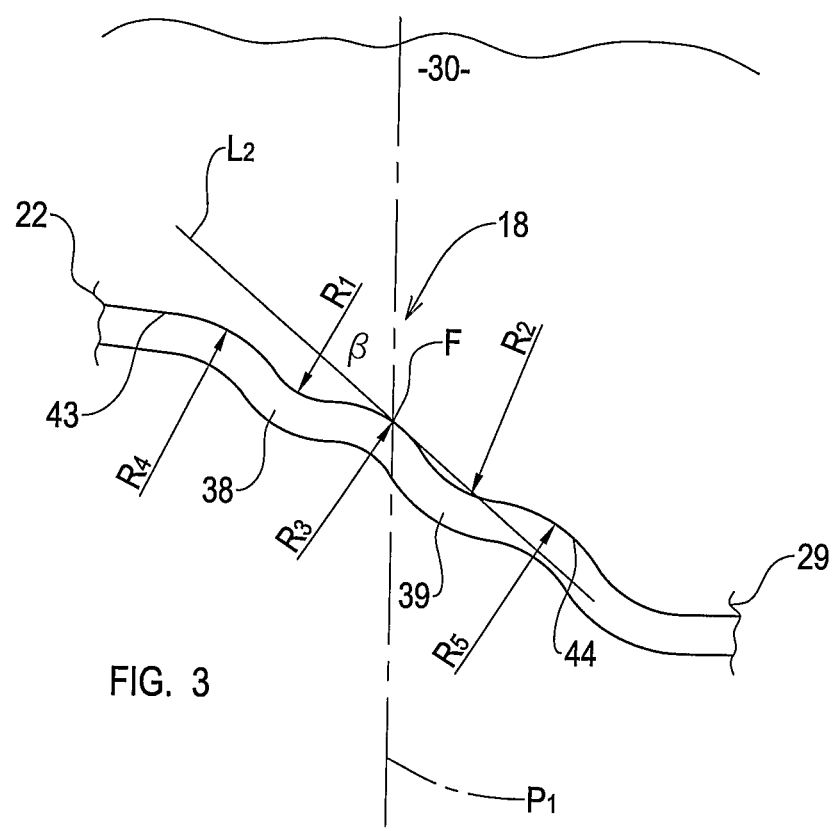
FIG. 3 is an enlarged cross sectional view through a continuously undulate side part portion of the rim of FIG. 2.

Referring to the drawings a wheel construction 10, typically for a tractor, industrial machine or the like, includes a rim 12 on which in use a tyre 13 is fitted (part of which is illustrated in FIG. 2 in dotted lines), and a disc 14 by means of which the wheel construction 10 is attachable to a hub or axle of a tractor, industrial machine or the like.

Figure 4:
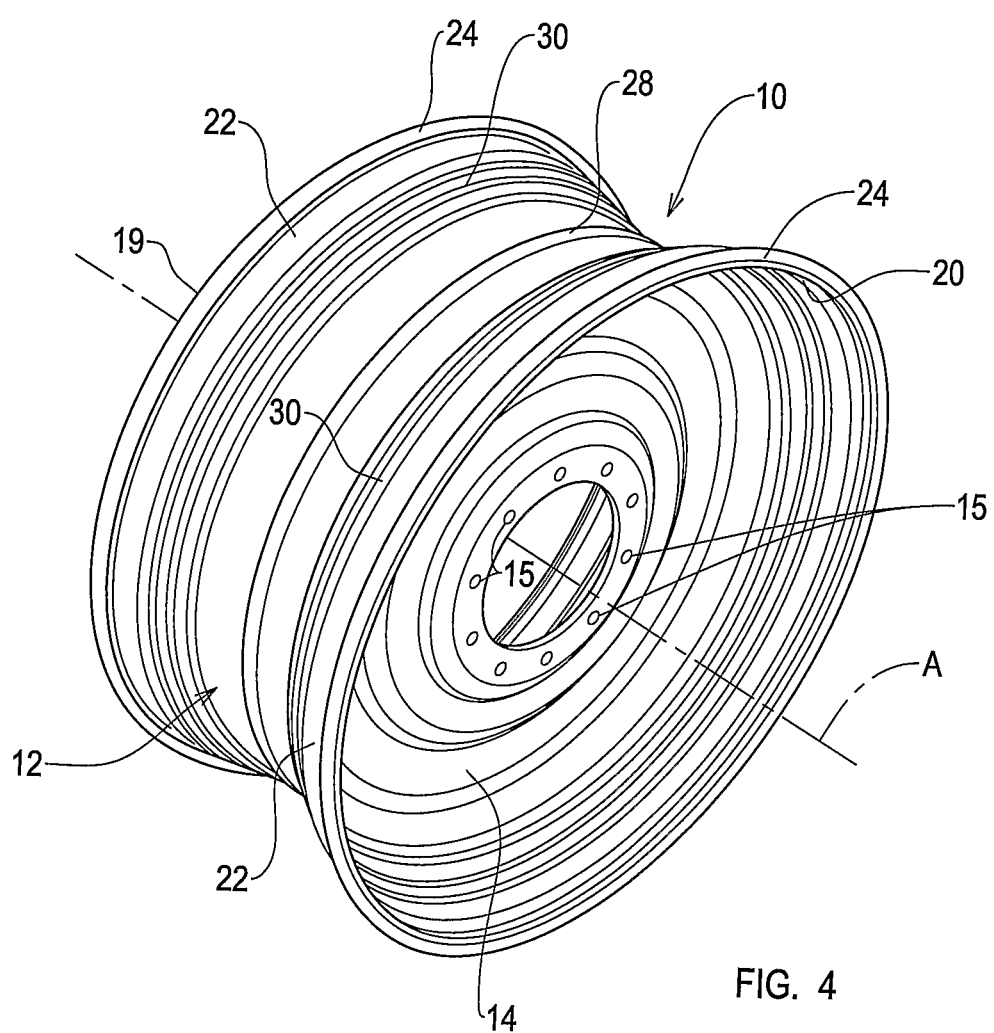
FIG. 4 is an illustrative perspective view of a wheel construction in accordance with the present invention.

The disc 14 includes a plurality of openings 15 to receive bolts or other fasteners for this purpose, and in the example of FIG. 4, the rim 12 is permanently fixed to the disc 14 by welding, but may in another example, as is well established in the art, be attached to the rim 12 by fastenings which may enable the axial position of the rim 12 relative to the vehicle hub or axle, to be changed, to alter the distance between a pair of the wheels which rotate about a generally common wheel axis A.

The rim 12 is circular, having a radially inner surface 17 and a radially outer surface 18, the tyre 13 being fitted in use to the radially outer surface 18, at what is commonly referred to as the "tyre side" of the rim 12.

The rim 12 includes respective axially inner and outer portions 19, 20, the radially outer portion 20 only being illustrated in FIGS. 1 and 2. In each of the prior art rim of FIG. 1 and the rim 12 of the wheel construction in accordance with the invention illustrated in FIG. 2, the outer portion 20 includes a frusto-conical connecting surface 22 which in cross section, appears to be a straight inclined surface, and a flange 24.

The configuration of the flange 24 does not form any part of this invention but for illustrative purposes, in FIG. 1, the flange 24 is provided by a formation which has a generally arcuate upstanding configuration, and in FIG. 2 the flange 24 is shown provided by a generally extended semicircular out-turned configuration.

In each case, the flange 24 provides a seat for a bead (not shown) provided on a tyre side wall (not shown), the flange 24 and bead in use providing an air-tight seal between them whereby air at pressure is maintained in the tyre 13.

FIG. 1 illustrates a prior art double well or "DW" rim 12 in which in addition to a central wheel well 28 provided in a generally axially central portion 29 of the rim 12, i.e. centrally of the rim width, a side part 30 of the rim 12 between the central wheel well 28 and the frusto-conical surface 22 of the outer portion 20, provides a second well 31. The central well 28 and the second well 31 afford the wheel rim 12 with the necessary structural stiffness.

The second well 31 is provided in a connecting part which includes a well side wall 34 which is substantially straight over a major portion of its length, and a curved region 33, the connecting part being connected to the straight connecting surface 22 and another straight surface 36 when viewed in cross section, the another straight surface 36 extending to and being connected to the central portion 29.

In accordance with ETRTO standards for "Agricultural Equipments", in FIG. 1 it can be seen that an angle α between a plane $P_1$ which extends perpendicular to the wheel axis A, and a line $L_1$ which in cross section is along the straight well side wall 34, is about 18° to 20°.

Thus the straight well side wall 34 approximates to the upright plane $P_1$ and thus the possible problem of the tyre side wall 27 temporarily sealing against the well side wall 34 may be realised.

Referring now to FIG. 2, in accordance with the present invention, the side part 30, between the frusto-conical connecting surface 22 of the outer portion 20 and the central portion 29 is continuously undulate so that there are no straight surfaces at all. Rather the side part 30 includes two curved regions 38, 39 which each provide a respective well 40, 41, the curved regions 38, 39 being immediately adjacent to one another.

An outermost of the curved regions, region 38, adjoins outwardly with the frusto-conical connecting surface 22 of the outer portion 20, via an externally radiused connection 43, and adjoins inwardly the other curved region 39, whilst the innermost of the curved regions, region 39, adjoins the central portion 29 of the rim 12 at an externally radiused connection 44.

Referring to FIG. 3, the continuously undulate side part 30 is shown to an enlarged scale. It can be seen that an effective angle β between the plane $P_1$ which is normal to the wheel axis A, and a line $L_2$ at any cross-sectional position around the rim 12 which contains a point of inflection F between the two curved regions 38, 39, is in the order of 33°, but in any event, is between 25° and 45°.

Moreover, in the example, the internal radii $R_1$, $R_2$ of the curved regions 38, 38 i.e. the radii of the concave tyre side 18 surfaces of the wells 40, 41, are each about 15 mm, but in an event are preferably in the range 10 mm to 20 mm.

The external convex radius $R_3$ of the tyre side 18 surface between the wells 40, 41 is also preferably about 15 mm but may be in the range 10 mm to 20 mm; also the external radius $R_4$ of the outermost curved region 38 where the curved region 38 adjoins the connecting surface 22 of the outer region 20 at 43, is within this range, and preferably about 15 mm. Where the inner curved region 39 adjoins the central well 28 at 44, the external radius $R_5$ of the inner curved region 39 again is preferably between 10 mm and 20 mm and typically in the order of 15 mm.

Desirably, as with the example illustrated in FIG. 3, the wheel construction 10 is substantially symmetrical, about a central wheel plane $P_4$, but in any event, preferably both the side parts 30 between the central portion 29 having the central well 28 and the frusto-conical connecting surfaces 22 of the inner 19 and outer 20 wheel portions are provided with two wells 40, 41 in addition to the central well 28.

Various modifications may be made without departing from the scope of the invention.

For example, in the embodiment shown in the drawings, the wheel construction 10 is a three well wheel construction with at least one of the side parts 30 providing two wells 40, 41, but in another embodiment, the or each side part 30 may provide more than two wells 40, 41. Thus it is within the scope of this invention for a wheel construction 10 to have any plurality of wells more than two, although practically, because of the finite axial extent or width of the wheel, a wheel construction 10 in accordance with the present invention may be of between a three and six well wheel construction.

The rim 12 described may be made by pressing steel, or otherwise and in other materials as required, e.g. the rim 12 may be cast or fabricated in another metal or non-metallic material.

In another example, the connecting surfaces 22 connecting the inner and outer portions 19, 20 of the rim 12 to the side parts 30 need not be frusto-conical, but may be cylindrical or of a more complex configuration as required.

In the example described and shown in the drawings, the wheel construction is symmetrical about the plane $P_4$. In another example between side parts 30 may be asymmetrical in which case there may not be a well 28 which is central axially (widthways) of the wheel construction 10. Thus a well 28 may be provided by a mid-portion which is not central, with each respective side part 30 extending between the mid-portion 29 and the inner or outer portion 19, 20 respectively. Desirably both the side parts 30 are continuously undulate with no straight surface (in cross section) between curved regions 38, 39 thereof, and each providing at least two wells 40, 41, but in another example, only one of the side parts 30 may be continuously undulate providing a plurality of wells.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A wheel construction including a wheel rim which in use, receives a tire, the rim being circular and having axially inner and outer portions each of which provides a flange which in use provides a seat for a bead of the tire, and the wheel construction including a mid-portion between the inner and outer portions, and side parts, connecting the mid and inner and outer portions, the mid-portion including a circumferential well where the radius of the wheel rim is a minimum, at least one of the side parts including a plurality of curved regions, the plurality of curved regions each being immediately adjacent to each other whereby the side part is continuously undulate, and wherein the curved regions provide at least a further two circumferential wells, and in that for each adjacent two curved regions, there is an effective angle between a plane normal to the axis of the wheel and a line struck tangentially at a point of inflection between the two curved regions at a tire side of the rim, of between 25° and 45° at any cross-sectional position around the rim.

2. A wheel construction according to claim 1 wherein the wheel construction has between three and six wells.

3. A wheel construction according to claim 1 wherein the effective angle is about 33°.

4. A wheel construction according to claim 1 wherein the internal radii of each curved region at the tire side of the rim, where the wells are provided, are both between 10 mm and 20 mm.

5. A wheel construction according claim 1 wherein the external radii at least where a curved region adjoins an adjacent curved region is between 10 mm and 20 mm.

6. A wheel construction according to claim 1 wherein where the axially outermost curved region adjoins an adjacent inner or outer portion of the rim, the external radius at the tire side of the rim is between 10 mm and 20 mm.

7. A wheel construction according to claim 1 wherein the axially innermost curved region directly adjoins the mid-portion without any straight surface therebetween.

8. A wheel construction according to claim 7 wherein the external radius where the innermost curved region and the mid-portion are adjoined, is between 10 mm and 20 mm.

9. A wheel construction according to claim 1 wherein the respective inner or outer portion of the rim includes a connecting surface which connects the side part to the flange, the connecting surface of the rim being generally frusto-conical.

10. A wheel construction according to claim 1 wherein both side parts of the wheel construction include a continuously undulate side part.

11. A wheel construction according to claim 10 wherein the wheel rim is generally symmetrical about a central wheel plane normal to the wheel axis, and the well provided by the mid-portion is a generally central well.

12. A wheel construction according to claim 1 wherein the wheel construction includes a central disc connected to the rim by one of permanent and separable connections, and the disc has a plurality of openings to enable the disc to be attached to a hub or axle of a vehicle.

13. A wheel construction including a wheel rim arranged to receive a tire, the wheel rim being circular and having an axially inner portion and an axially outer portion, each of the axially inner portion and the axially outer portion including a flange forming a seat for a corresponding bead of the tire, the wheel construction comprising:
    a mid-portion between the axially inner portion and the axially outer portion, the mid-portion including a first circumferential well where the radius of the wheel rim is a minimum, the first circumferential well centered about an axis of the wheel rim;
    a first side part connecting the mid-portion to the axially inner portion, and a second side part connecting the mid-portion to the axially outer portion;
    at least one of the side parts including a plurality of curved regions, the plurality of curved regions each being immediately adjacent to one another such that the at least one side part is continuously undulate;
    wherein the curved regions provide at least a second circumferential well and a third circumferential well, both of the second and third circumferential wells coaxial with the first circumferential well; and
    wherein, for at least two adjacent curved regions, there is an effective angle between a plane normal to the axis of the wheel and a line struck tangentially at a point of inflection between the two adjacent curved regions at a tire side of the rim, the effective angle measuring between 25° and 45°; and
    wherein the effective angle at the point of inflection between the two adjacent curved regions is the same at all cross-sectional positions around the rim.

14. The wheel construction of claim 13, wherein the first side part is joined to the axially inner portion with no straight surfaces disposed between the first side part and the axially inner portion.

15. The wheel construction of claim 13, wherein the rim includes a radially outer surface and a frusto-conical connecting surface terminating in a flange, and wherein the radially outer surface along the first and second side parts is radially smaller than the radial outer surface along the frusto-conical connecting surface.

16. A wheel construction including a wheel rim arranged to receive a tire, the wheel rim being circular and having an axially inner portion and an axially outer portion, each of the axially inner portion and the axially outer portion including a flange forming a seat for a corresponding bead of the tire, the wheel construction comprising:

a mid-portion between the axially inner portion and the axially outer portion, the mid-portion including a first circumferential well where the radius of the wheel rim is a minimum, the first circumferential well centered about an axis of the wheel rim;

a first side part connecting the mid-portion to the axially inner portion, and a second side part connecting the mid-portion to the axially outer portion;

at least one of the side parts including a plurality of curved regions, the plurality of curved regions each being immediately adjacent to one another such that the at least one side part is continuously undulate, all of the side part extending radially outward;

wherein the curved regions provide at least a second circumferential well and a third circumferential well, both of the second and third circumferential wells coaxial with the first circumferential well; and wherein, for at least two adjacent curved regions, there is an effective angle between a plane normal to the axis of the wheel and a line struck tangentially at a point of inflection between the two adjacent curved regions at a tire side of the rim, the effective angle measuring between 25° and 45°; and wherein a cross-section taken at the adjacent curved regions is uniform at all circumferential positions around the wheel rim.

\* \* \* \* \*